Nov. 4, 1958

C. P. SPAULDING 2,859,432

CODE GENERATING DEVICE

Filed June 10, 1955

2 Sheets-Sheet 1

CARL P. SPAULDING,
INVENTOR.

BY

Barkelew & Scantlebury
ATTORNEYS

Nov. 4, 1958

C. P. SPAULDING

CODE GENERATING DEVICE 2,859,432

Filed June 10, 1955

2 Sheets-Sheet 2

CARL P. SPAULDING,
INVENTOR.

BY

Barkelew + Scantlebury
ATTORNEYS.

United States Patent Office 2,859,432

Patented Nov. 4, 1958

2,859,432

CODE GENERATING DEVICE

Carl P. Spaulding, San Marino, Calif., assignor, by mesne assignments, to Datex Corporation, Monrovia, Calif., a corporation of California Application June 10, 1955, Serial No. 514,470

4 Claims. (Cl. 340—347)

This invention is concerned with means for developing a binary code representation of the relative position of two members that are relatively rotatable through an angle greater than 360°.

The invention is particularly useful in connection with the generation of monostrophic digital code signals that represent relative rotary positions of the type described.

The invention is more particularly concerned with code generation of the type in which the code signal for each binary digit is developed by a physical configuration that corresponds spacially to the code to be generated and that rotates with one member, and a sensing device that rotates with the other member and is responsive to physical differences in the configuration. An example of such a configuration is a commutator structure with conductive and non-conductive areas arranged in accordance with the code to be developed, the sensing device then being typical a brush engaging the commutator surface. Alternatively, for example, the code configuration may comprise an optical diaphragm with relatively transparent and opaque areas arranged in accordance with the code, the sensing device typically comprising a light source and photoelectric cell. Many other physical phenomena have been utilized in an analogous manner for developing code representations of the relative position of two members. For illustration, and without implying any limitation of the scope of the invention, it will be described primarily with relation to the commutator type.

It is a common practice to develop a code representation of the rotational position of a shaft with respect to a frame, for example, by means of a plurality of brushes mounted on the frame and engaging respective portions of a commutator surface that turns with the shaft and carries conductive and non-conductive segments arranged in suitable configurations appropriate to the desired code, each brush typically corresponding to one digit of a binary code. The resulting binary code representation of the shaft position may provide a highly accurate indication of the shaft angle. For example, by utilizing ten brushes which correspond to ten digits of a binary code, $2^{10}$ different code signals may be developed, corresponding to distinct respective ranges of angle. Each angular range then typically equals $360°/2^{10}$, or about 0.35°. If greater accuracy is required, further binary digits may be provided, the practical limit depending upon such factors as mechanical dimensional accuracy and the minimum feasible variations in the dimensions of the contact area of each brush.

Such code representations of a shaft position, or of the relative position of any two mutually rotatable members, may be utilized for a wide variety of purposes, such as transmission of information to a distant point, supply of data in digital form to recording or computing devices, control functions and the like, with which the present invention is not directly concerned.

The present invention is more particularly concerned with problems that arise when a shaft, for example, is rotatable through more than one complete revolution, and when it is required to develop a code signal that distinguishes between different revolutions. For instance, two complete revolutions may be involved, amounting to a total angular range of 720°, and it may be required to distinguish between the angle $x$ and the angle $360°+x$. In the prior art, that type of distinction has sometimes been accomplished by driving a commutator at a slower speed than the shaft, as by precision gearing, so that the total angle through which the main shaft may move corresponds to rotation of the commutator through only 360° or less. Such a geared-down commutator may be utilized to develop code signals for all digits, or some of the digits of less significance may be controlled by a commutator driven directly with the main shaft. Any such device has serious limitations, particularly when the highest accuracy is required. For example, it may be difficult or impossible to obtain gearing that is sufficiently accurate and free of backlash to insure the required accuracy of angular relation between the commutator and shaft.

In accordance with the present invention, all such difficulties are completely avoided by developing all of the code signals from commutator configurations that rotate with the main shaft, or other member. In order to distinguish between successsive revolutions, some or all of those commutator configurations are arranged along paths that are of spiral form with respect to the shaft axis, and means are provided for causing the individual brushes to describe corresponding spiral paths with respect to the commutator surface. Such spiral paths may extend through substantially any desired number of revolutions without overlapping. In practice, however, it is not usually necessary to provide for more than, say, ten revolutions of the shaft.

Such spiral arrays of commutator code configurations may be formed on surfaces of revolution of any convenient type. It is ordinarily preferred to utilize plane surfaces perpendicular to the axis of rotation, but other types of surface, such as conical or cylindrical, may be used, and the term "spiral" as employed herein is to be understood in its generic sense unless the context clearly indicates the contrary.

The invention is particularly useful for generation of code signals of the type in which only one digit changes value at a time. Such codes are referred to as syncopic or monostrophic. In polystrophic codes, in which two or more digits may change value at the same time, special precautions are necessary to prevent spurious values due to one of those digits changing value before another. Such spurious or ambiguous values can be prevented by providing additional mechanism of various types. For example, two spaced brushes may be employed instead of a single brush for each digit, and control of the output may be shifted from one brush to the other under control of the digit of next lower significance. Auxiliary mechanism of that general type, although adding to the complexity, expense and maintenance cost of such apparatus, has the advantage that the automatic shifting of control from one brush to the other in each of the digits of higher significance reduces the accuracy requirements for the corresponding commutator segments. For that reason, when angular ranges greater than 360° are to be represented by ordinary codes, together with suitable means for preventing ambiguities, the inherent inaccuracies of gearing between portions of the commutator system do not necessarily cause difficulty.

On the other hand, when monostrophic codes are used, the question of ambiguity does not arise, since only one digit changes at a time. This has the great advantage of avoiding completely the additional mechanization previously required for avoiding the ambiguities. However, in monostrophic codes all digits are subject to the same requirements as to accuracy of control. Hence the loss of accuracy inherent in the use of a geared-down commutator for certain digits would be a serious disadvantage. By arranging some or all of the commutator arrays along spiral paths that extend throughout the full range of angular movement to be represented, the present invention completely solves the problems of ambiguity and of mechanical accuracy at the same time, yielding a system that is remarkably simple and reliable and that is capable of great inherent accuracy of indication.

A full understanding of the invention and of its further objects and advantages will be had from the following description of certain illustrative embodiments, of which description the accompanying drawings form a part. The particulars of that description are intended only as illustration and not as a limitation upon the scope of the invention, which is defined in the appended claims.

*Table 1*

Figure 1:
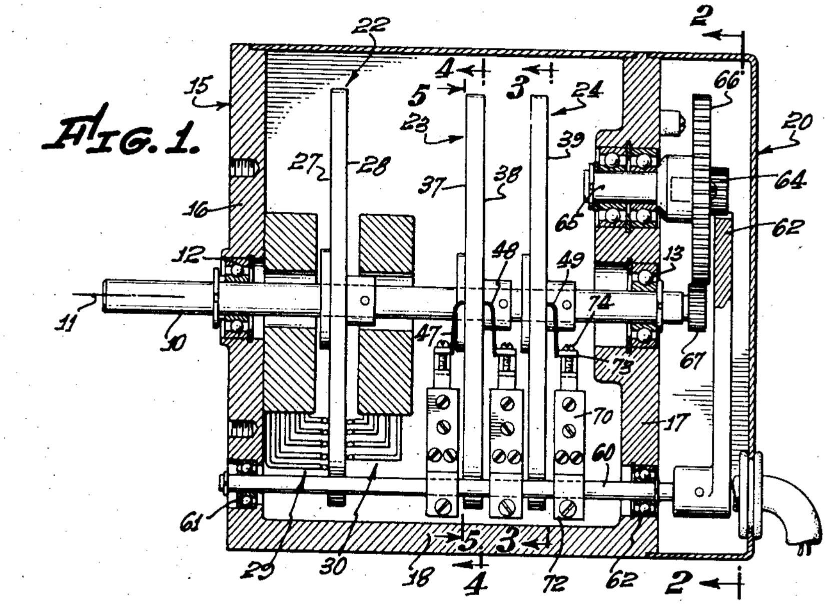
Fig. 1 is a side elevation, partially cut away, representing an illustrative embodiment.
Figure 2:
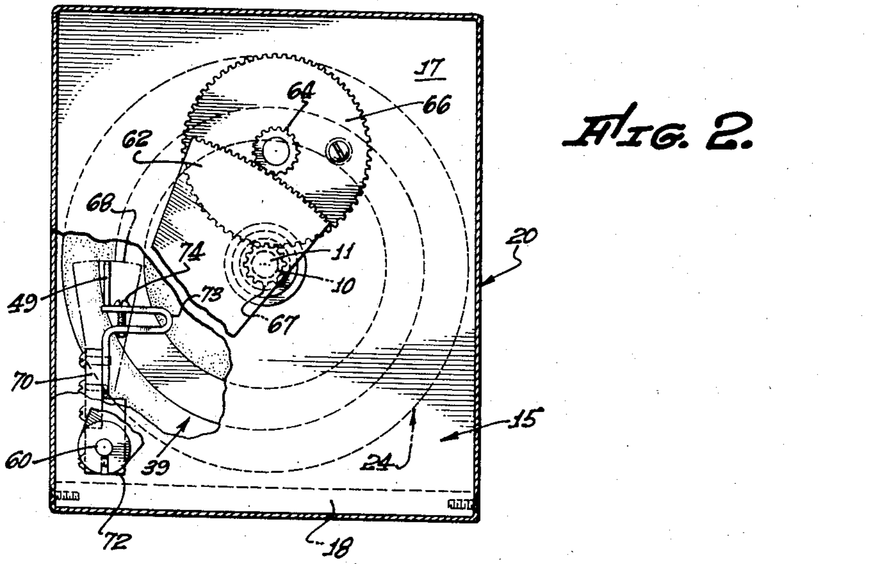
Fig. 2 is a transverse section on line 2—2 of Fig. 1.

| Angle | Bit No. | | | |
|---|---|---|---|---|
| | 7 | 8 | 9 | |
| 0 | 0 | 0 | 0 | 0 |
| 22.5 | 1 | 0 | 0 | 0 |
| 45 | 1 | 1 | 0 | 0 |
| 67.5 | 0 | 1 | 0 | 0 |
| 90 | 0 | 1 | 1 | 0 |
| 112.5 | 1 | 1 | 1 | 0 |
| 135 | 1 | 0 | 1 | 0 |
| 157.5 | 0 | 0 | 1 | 0 |
| 180 | 0 | 0 | 1 | 1 |
| 202.5 | 1 | 0 | 1 | 1 |
| 225 | 1 | 1 | 1 | 1 |
| 247.5 | 0 | 1 | 1 | 1 |
| 270 | 0 | 1 | 0 | 1 |
| 292.5 | 1 | 1 | 0 | 1 |
| 315 | 1 | 0 | 0 | 1 |
| 337.5 | 0 | 0 | 0 | 1 |
| 360 | ---- | ---- | ---- | ---- |

*Table 2*

| Angle | Bit No. | | | |
|---|---|---|---|---|
| | 9 | 10 | 11 | 12 |
| 0 | 0 | 0 | 0 | 0 |
| 90 | 1 | 0 | 0 | 0 |
| 180 | 1 | 1 | 0 | 0 |
| 270 | 0 | 1 | 0 | 0 |
| 360 | 0 | 1 | 1 | 0 |
| 450 | 1 | 1 | 1 | 0 |
| 540 | 1 | 0 | 1 | 0 |
| 630 | 0 | 0 | 1 | 0 |
| 720 | 0 | 0 | 1 | 1 |
| 810 | 1 | 0 | 1 | 1 |
| 900 | 1 | 1 | 1 | 1 |
| 990 | 0 | 1 | 1 | 1 |
| 1,080 | 0 | 1 | 0 | 1 |
| 1,170 | 1 | 1 | 0 | 1 |
| 1,260 | 1 | 0 | 0 | 1 |
| 1,350 | 0 | 0 | 0 | 1 |
| 1,440 | ---- | ---- | ---- | ---- |

An illustrative monostrophic binary code of a type suitable for use in connection with the invention is shown in fragmentary form in Tables 1 and 2. The particular code represented is adapted for members rotatable through four complete revolutions. The binary digits, or "bits," of less significance than the 7th are arbitrarily omitted from the tables for clarity, since they may vary in an entirely conventional manner. Table 1 represents all change of value of the 7th, 8th and 9th bits, with the angles at which those changes take place. The table extends only from 0° through 360°, since the pattern repeats every 360°. However, although the periods of repetition of the patterns of code configurations for those bits are 360° and sub-multiples of 360°, the signals corresponding to those bits uniquely determine the shaft angle only within an angular interval of 180°. Thus, all combinations of values of bits 7, 8 and 9 that occur between 0° and 180° occur again, and in different order, between 180° and 360°. In the present illustrative code, the order of the signals in the odd 180° intervals is the opposite of that in the even 180° intervals. That remains true also if bits of less significance than the 7th are included. Thus, for all bits from 1 through 9 in the present code, the same code signal may represent any one of the eight angles $x$, $360°-x$, $360°+x$, $720°-x$, $720°+x$, $1080°-x$, $1080°+x$, and $1440°-x$, where $x$ is an angle between 0 and 180°. Three additional binary digits are required to distinguish between those eight values. Those additional digits, designated as bits 10, 11 and 12, respectively, all have periods of repetition greater than 360°. Typical configurations for those bits are shown in Table 2, together with the corresponding values for the 9th bit, which are copied from Table 1 to clarify the relationship between the two tables.

It is emphasized that the numbering of the bits in the present example is merely illustrative in two particular respects. If greater or less accuracy of representation is required, the cycle of variation of the 1st bit may be changed accordingly, shifting the names of the entire series accordingly. And if more or fewer than four complete revolutions (eight 180° intervals) are to be represented, more or fewer than three bits may be required having cycles of repetition greater than 360°.

When non-monostrophic codes are used, the repetition period of each digit except the last is typically reduced by a factor of two, compared to the monostrophic code in the tables. For example, the values of the 10th bit between 360° and 720° may be an exact repetition of the values between 0° and 360°. Hence the 10th bit in a corresponding non-monostrophic code may be developed by a directly driven commutator of conventional type.

In the illustrative embodiment of Figs. 1 to 4, a shaft 10 is journaled on the axis 11 in the bearings 12 and 13 in a frame 15. Frame 15 includes two parallel spaced plates 16 and 17 and a web portion 18 rigidly joining the plates. A cover may be provided, as indicated at 20. Shaft 10 and frame 15 are illustrative of any two mutually rotatable members, it being immaterial for most purposes whether or not one of those members is fixed. For convenience of description, however, frame 15 will be considered as a fixed frame of reference, with respect to which the shaft position may vary throughout four complete revolutions, or 1440°. Within that range, the rotary position of shaft 10 with respect to frame 15 is to be uniquely represented in the form of a binary digital code signal. The particular instrumentation to be described is of commutator type and develops signals corresponding to the typical code of Tables 1 and 2.

In the present embodiment the commutator surface comprises a plurality of distinct and physically separate surface areas or faces. Those areas, all of which are flat, mutually parallel and normal to axis 11, comprise typically five faces of the three disks 22, 23 and 24. Those disks or their equivalent are rigidly mounted on shaft 10, as by suitable hubs and set screws as indicated. Disk 22 carries on each of its opposite faces 27 and 28 a plurality of commutator configurations, typically nine in number, which are engaged by the respective fixed brushes indicated at 29 and 30. Those commutator configurations in the present embodiment are of conventional circular type. They correspond typically to the nine bits 1 to 9, partially shown in Tables 1 and 2, and thus act collectively to develope a monostrophic code representation of the shaft position within the particular 180° interval in which it lies. That portion of the overall code signal, however, as already indicated, does not distinguished between different 180° intervals. Three additional binary digits are required to distinguish among those eight intervals.

The commutator configurations corresponding to those three digits, denoted as bits 10, 11 and 12, in Table 2, are formed in the respective disk faces 37, 38 and 39. Faces 37 and 38 are shown as the opposite faces of disk 23, and face 39 is one face of disk 24. That arrangement is preferred, but is not necessary, since, for example, two or more spiral code configurations may be formed in the same face, either in different radial zones or in interlocked double-spiral formation. The commutator configurations on faces 37, 38 and 39 are engaged by respective brushes indicated in Fig. 1 at 47, 48 and 49. In accordance with the invention, each of those configurations is arranged in a spiral path, as illustratively shown in Figs. 3, 4 and 5. In each of those figures, electrically conductive portions of the commutator surface are represented by vertical shading and non-conductive portions are represented by unshaded areas.

Figures 3, 4, 6:
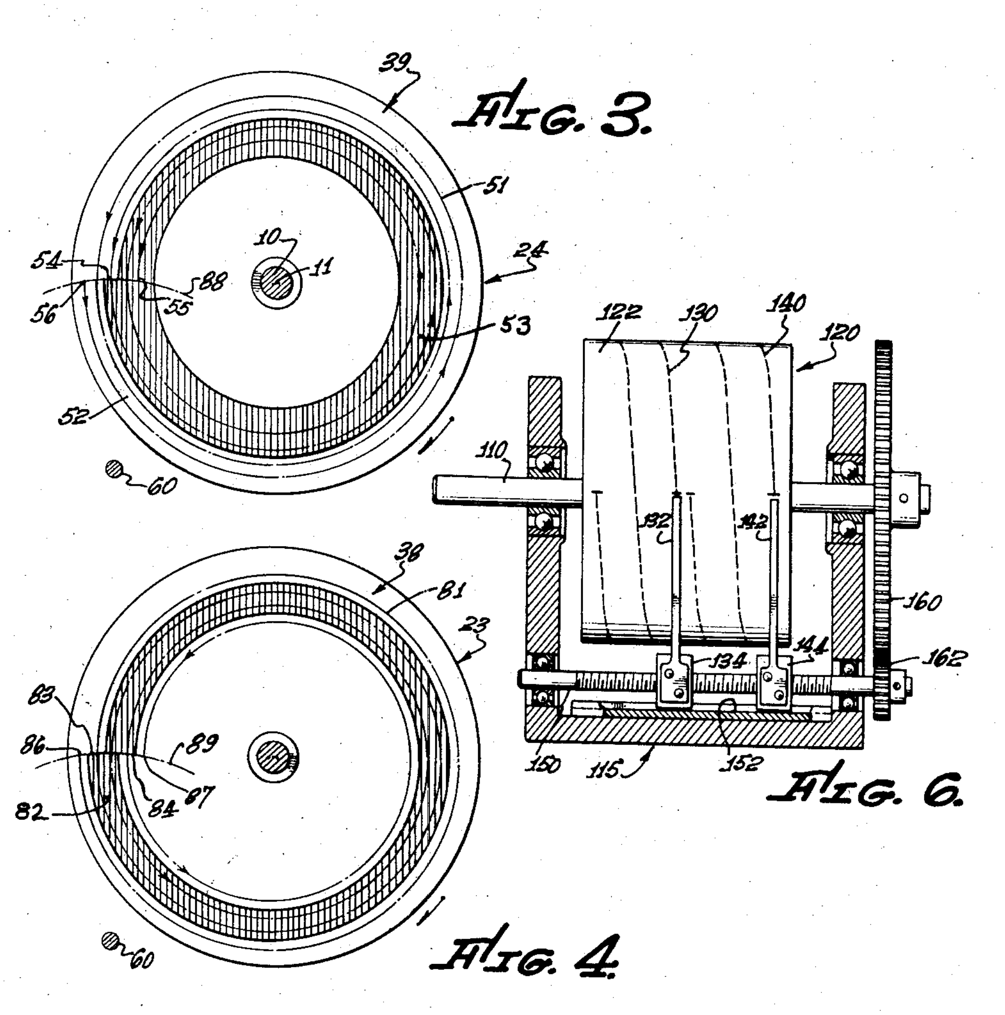
Fig. 3 is a transverse section on line 3—3 of Fig. 1.
Fig. 4 is a transverse section on line 4—4 of Fig. 1.
Fig. 6 is a side elevation partially cut away, representing a further illustrative embodiment.

In Fig. 3 the dot-dash line 51 represents the center line of the spiral configuration path on face 39 of disk 24. That path is seen to extend through four complete revolutions without overlapping. Overlapping of the path on successive revolutions is prevented by the progressive transverse offset, which appears in the present embodiment as a progressive change of path radius. For most purposes it is immaterial whether the path spirals inward or outward with increasing shaft angle, but it is preferred that all spiral paths progress in the same direction. In the present embodiment, zero shaft angle will be taken for definiteness at the outer end of the path, indicated at 56 in Fig. 3.

The code configuration along path 51, which corresponds to bit 12, is particularly simple, comprising an outer segment 52 of insulating material, which extends from 0° to 720°, and which typically comprises the material of which the disk is formed; and an inner segment 53 of conductive material, which extends from 720° to 1440°, and which typically comprises a thin sheet of metal embedded in the face of the disk and electrically connected in any suitable manner to shaft 10. It is convenient to form both turns of conductive segment 53 as a single generally annular area of conductive material. That area has a sharp and accurately defined radial edge at 54, which forms the boundary between conductive and non-conductive segments 53 and 52. In the present embodiment no such physically defined boundary is required at the inner end 55 of inner segment 53, nor at the outer end 56 of outer segment 52. Those boundaries are indicated schematically in Fig. 3, but are typically not associated with any physical change in the disk surface.

Figure 5:
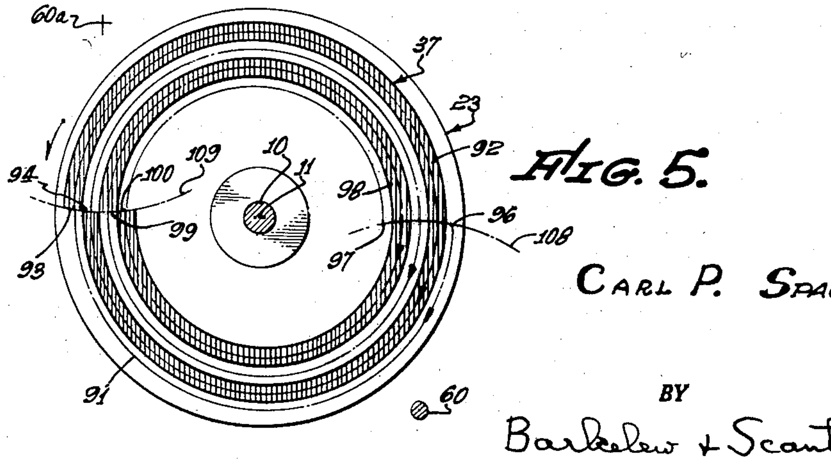
Fig. 5 is a transverse section on line 5—5 of Fig. 1.

Figs. 4 and 5 show typical spiral commutator configurations appropriate to the 11th and 10th bits, respectively, of the present illustrative code. Each configuration comprises alternating areas of conductive and non-conductive material. The brush path for bit 11 (Fig. 4) is indicated at 81 and spirals inwardly in a counterclockwise direction (like path 51 of Fig. 3) from 0° at 86 to 1440° at 87. The brush path for bit 10 (Fig. 5), which is on the opposite face of disk 23, spirals inwardly in a clockwise direction, as indicated at 91, extending from 0° at 96 to 1440° at 97. The conductive segment 82 for bit 11 extends along brush path 81 through a distance of 720° from 360° at 83 to 1080° at 84; while the configuration for bit 10 has two distinct conductive segments 92 and 98, which are mutually spaced along brush path 91, but may be physically joined together. Segment 92 extends from 180° at 93 to 540° at 94, and segment 98 extends from 900° at 99 to 1260° at 100, in accordance with Table 2.

Brushes 47, 48 and 49 are mounted with respect to frame 15 in such a way that their positions are substantially fixed with respect to the frame in a direction longitudinal of the commutator path at the point of brush contact; but are movable relative to the frame in a direction transverse of that path. The latter movement is driven by any suitable type of coupling in direct correspondence to the relative rotary movement of the shaft and frame. That correspondence is such as to cause each brush to follow a distinct spiral track that extends without overlapping through an angle of 1440° (in the present instance). An important feature of the invention is that the transverse brush movement is not required to follow that spiral path with great precision, since the commutator configurations may extend for an appreciable distance on both sides of the center line of the path. Hence the brush drive connection ordinarily need not involve parts or workmanship of unusually high precision.

The drawings illustrate a particularly effective and economical manner of controlling the brush movement. All three brushes 47, 48 and 49 are mounted on a single rocker shaft 60, journaled on bearings 61 and 62 in frame 15 parallel to main input shaft 10. Brush 49, for example, is carried on a brush bracket 70 which is rigidly mounted on shaft 60, as by the clamp 72, which may be released to provide rotary adjustment of the brush with respect to shaft 60. Relatively accurate radial adjustment of each brush is preferably provided, as by means of the resilient bow 73 and adjusting screw 74. By tightening the screw 74, the radius of brush 49 with respect to shaft 60 may be reduced, for example, thereby advancing the brush a corresponding distance along its commutator path 51. Such independent adjustment of the respective brushes with respect to the shaft on which they are mounted provides a particularly convenient and effective means for providing accurate relative phasing of the respective code signals.

Each brush proper is preferably so formed as to exert light yielding pressure on the communtator surface, which it touches over an area that is well-defined and preferably quite narrow circumferentially of shaft 10. The location of rocker shaft 60 and the length of the brush supporting arm are such that the arm extends substantially tangentially to spiral path 51 at the point of brush contact.

Rocker shaft 60 is driven by a geared sector 62, which is fixed on the shaft and is engaged by a pinion 64 on the jack shaft 65. Shaft 65 carries a gear 66, which is engaged and driven by a pinion 67, fixed on main input shaft 10. The described gear train is so proportioned as to drive rocker shaft 60 through the relatively small arc 68 in response to four revolutions of shaft 10, that arc being such as to carry brush 49 through the total radial extent of spiral path 51. A particular advantage of the described structure is that it inherently leads to accurate positioning of each brush longitudinally of its path on the commutator, since the radial play in the journal bearings of rocker shaft 60 can readily be made substantially zero.

Brushes 48 and 47 are mounted, like brush 49, for movement with respect to frame 15 in a direction transverse of their respective commutator paths 81 and 91. All of the brushes are preferably mounted on the same rocker shaft 60, as shown, and are driven in unison by the mechanism already described. However, for example if different spiral pitches are desired, separate drive means for one or more brushes may be provided. The several brushes may also be mounted at different azimuths about main shaft 10, the respective commutator configurations being oriented accordingly. All of the disk faces that have been described may be considered as forming together a single commutator surface.

In laying out all of the spiral commutator configurations in the present embodiment, it is preferred that the boundaries between adjacent segments be arranged approximately on circular arcs rather than on radii with respect to axis 11. Such arcs are indicated in Figs. 3, 4 and 5 at 88, 89 and 108, 109, respectively. Those arcs correspond to the circular movement of the respective brushes about the axis of shaft 60, as indicated at 68 in Fig. 2 for brush 49, and have radii of curvature equal to the radii of the respective brushes from the axis of shaft 60, which radii are preferably, but not necessarily, all equal. The several arcs are concentric with shaft 60 when main shaft 10 is in the rotational positions represented by the respective segmental boundaries. In Fig. 4, for example, the segment boundaries 86, 83, 84 and 87, correspond to shaft angles 0, 360, 1080 and 1440°, respectively, and lie on arcs that all coincide and are collectively indicated at 89. In Fig. 5, segment boundaries 96 and 97, corresponding to 0 and 1440°, respectively, lie on one arc 108; and boundaries 93, 94, 99 and 100 lie on a common arc 109 which is angularly spaced 180° from arc 108 and has its center at *60a*, the position of shaft 60 when main shaft 10 is turned 180° from the position shown in the drawing.

As illustrated, the equal radii of the brushes with respect to shaft 60 are so related to the spacing between shaft 60 and main axis 11 that the described arcs are tangent to radial lines drawn from that axis. That relation is found to be convenient, and it is preferred that it be satisfied at least approximately. It may be noted that the described adjustment of each brush radius, as by screw 74, is required in practice to have only a short range of movement compared to the other distances involved, and does not appreciably disturb any of the relations that have been described.

Fig. 6 illustrates, somewhat schematically, a code-generating commutator arrangement in which the commutator surface is cylindrical and the commutator configurations are of the spiral type more precisely denoted as helical. The respective brush paths on the commutator may then be considered to depart from circular form by progressive transverse offset in an axial direction, rather than in a radial direction as in the embodiment already described. In both instances, as well as in further variants such as conical arrangements, the direction of progressive offset is parallel to the commutator surface at the point of brush contact and is generally parallel to an axial plane through that point of contact.

In Fig. 6, shaft 110 is journaled in the frame 115 and carries a cylindrical commutator structure 120 having helical commutator configurations in its cylindrical surface 122. Two such brush paths are indicated illustratively and schematically at 130 and 140, corresponding to the brushes 132 and 142. Those paths as shown extend through 720° about shaft 110, and are therefore adapted for developing code signals capable of identifying any 180° range within two complete revolutions of shaft 110. The configurations, which are not explicitly represented in the drawing, may correspond, for example, to bits 10 and 11 as shown in Table 2 for the angular range between 0° and 720°. Code signals corresponding to bits of lesser significance, such as bits 1 through 9 of Tables 1 and 2, may be developed in conventional manner, as already indicated in connection with the previously described embodiment.

The cylindrical form of commutator in accordance with the invention is particularly suitable for developing code representations of the relative position of members rotatable through a relatively large number of complete revolutions, since a helical path involves no change of radius and may extend through many revolutions.

As shown illustratively in Fig. 6, brushes 132 and 142 are carried on respective nuts 134 and 144, which engage the lead screw 150 and are guided by suitable ways, indicated at 152. Lead screw 150 is journaled in frame 115 and is driven in accordance with rotation of shaft 110, as by direct gearing. As shown, a spur gear 160 is fixed on shaft 110 and drivingly engages a pinion 162 on lead screw 150. The ratio of gears 160, 162 and the pitch of screw 150 are such that the resulting axial brush movement corresponds to the pitch of the commutator configurations 130 and 140.

I claim:

1. Signal generating means for developing a binary digital code indication of the relative rotary position of two members that are mutually rotatable through an angle greater than 360° about an axis, said signal generating means comprising commutator structure having its operating surface normal to the axis and rotatively fixed with respect to one of the members, a shaft journaled on the other member parallel to the axis and spaced therefrom, a brush rotatively fixed on the shaft at a substantially predetermined brush radius therefrom and engaging the commutator surface, speed reduction gear means drivingly connecting the shaft and said one member and acting to rock the shaft through a predetermined acute angle in response to relative rotation of the members through the said angle greater than 360°, thereby causing the brush to describe a spiral path on said commutator surface that extends without overlapping through the said angle greater than 360°, the commutator surface comprising a series of alternating conductive and non-conductive commutator segments extending along the said path, the boundaries between adjacent segments of the series lying substantially on circular arcs having a common radius of curvature equal to said brush radius and having respective centers angularly distributed about said axis at a common radial distance equal to said spacing between the shaft and the axis.

2. In combination with two members that are relatively rotatable about an axis through a continuous angular range greater than 360°, structure forming a surface of revolution with respect to the axis and rotatively fixed with respect to one of the members, said surface comprising areas of two types having distinctive physical conditions, a plurality of sensing means mounted for rotation with the other member and responsive selectively to the two alternative physical conditions of the surface at respective sensing points thereof that move with member rotation along respective paths on the surface, the portions of said surface that lie along said paths comprising areas of the two said types that alternate uniformly with respective periods of repetition, said periods of repetition comprising integral multiples and sub-multiples of 360°, said surface portions cooperating with the respective sensing means to develop a monostrophic digital code representing the relative rotary position of the two members, at least the paths having periods of repetition greater than 360° being of spiral form with respect to said axis and extending without overlapping throughout the said angular range greater than 360°.

3. In combination with two members that are relatively rotatable about an axis through a continuous angular range that includes at least three successive 180° intervals, structure forming a surface of revolution with respect to the axis and rotatively fixed with respect to one of the members, said surface comprising areas of two types having distinctive physical conditions, a plurality of sensing means mounted for rotation with the other member and responsive selectively to the two alternative physical conditions of the surface at respective sensing points thereof that move with member rotation along respective paths on the surface, said sensing means comprising two sets, the sensing means of one set at being substantially fixed with respect to said other member, whereby their respective paths are circular, and the sensing means of the other set being at least two in number and being substantially fixed rotatively with respect to said other member and being movable generally parallel to their respective axial planes in response to member rotation, whereby their respective paths are of spiral form, the portions of said surface that lie along said circular paths comprising areas of the two said types that alternate uniformly with respective periods of repetition equal to 360° and integral submultiples thereof, and that cooperate with respective sensing means of the first set to develop a monostrophic digital code representing the relative rotary position of the members within the particular 180° interval in which it lies, and the portions of said surface that lie along said spiral paths comprising areas of the two said types that alternate uniformly with respective periods of repetition greater than 360° and that cooperate with respective sensing means of the second set to develop a monostrophic digital code representing the said particular 180° interval.

4. In combination with two members that are relatively rotatable about an axis through a continuous angular range that includes at least three successive 180° intervals, commutator structure forming a surface of revolution with respect to the axis and rotatively fixed with respect to one of the members, a plurality of brushes mounted with respect to the other member and engaging the commutator surface at respective points that move with member rotation along respective paths on the surface, said brushes comprising two sets, the brushes of one set being substantially fixed with respect to the other member, whereby their respective paths on the commutator surface are circular, and the brushes of the other set being at least two in number and being substantially fixed rotatively with respect to the other member and being movable generally parallel to their respective axial planes in response to member rotation, whereby their respective paths are of spiral form, the portions of the commutator surface that lie along said circular paths comprising respective patterns of conductive and non-conductive commutator segments that have respective periods of repetition equal to 360° and integral submultiples thereof, and that cooperative with the brushes of the first set to develop a monostrophic digital code representing the relative rotary position of the members within the particular 180° interval in which it lies, and the portions of the commutator surface that lie along said spiral paths comprising respective patterns of conductive and non-conductive commutator segments that have respective periods of repetition greater than 360° and that cooperate with the brushes of the second set to develop a monostrophic digital code representing the said particular 180° interval.

References Cited in the file of this patent

UNITED STATES PATENTS

| | | |
|---|---|---|
| 1,389,429 | Gilman | Aug. 30, 1921 |
| 1,877,625 | Loughridge | Sept. 13, 1932 |
| 2,132,213 | Locke | Oct. 4, 1938 |
| 2,502,837 | Entz | Apr. 4, 1950 |